No. 701,383. Patented June 3, 1902.
J. PATTEN.
VACUUM GAGE.
(Application filed Dec. 5, 1900.)
(No Model.)

Witnesses
J. G. Hinkel
C. W. Clement

Inventor
John Patten

Attorneys

UNITED STATES PATENT OFFICE.

JOHN PATTEN, OF BALTIMORE, MARYLAND, ASSIGNOR TO PATTEN VACUUM ICE MACHINE COMPANY, (SUCCESSOR TO THE HOME ICE MACHINE COMPANY,) OF BALTIMORE, MARYLAND, A CORPORATION OF WEST VIRGINIA.

VACUUM-GAGE.

SPECIFICATION forming part of Letters Patent No. 701,383, dated June 3, 1902.

Application filed December 5, 1900. Serial No. 38,829. (No model.)

*To all whom it may concern:*

Be it known that I, JOHN PATTEN, a citizen of the United States, residing at Baltimore, in the State of Maryland, have invented certain new and useful Improvements in Vacuum-Gages, of which the following is a specification.

This invention relates to gages especially designed for indicating high vacuums; and it comprises certain improvements in design and construction whereby superfluous gases within the gage may be detected and released as often as they accumulate, so that the accuracy of the gage may be maintained.

It frequently occurs in the use of vacuum-gages consisting of bent tubes in which are placed liquids to indicate the degree of vacuum that an abnormal amount of gas will accumulate from time to time in the sealed end of the tube, and thus destroy the accuracy of the gage. This difficulty arises most frequently in gages used to indicate high vacuums and results from various causes, such as the absorption of gases from the atmosphere by the liquid when not in use, or the liberation of gases contained within the liquid itself, or the generation of gases by chemical reaction upon foreign substances contained within the liquid. In the ordinary vacuum-gage of this description it is impossible to ascertain while the gage is in use whether superfluous gases have accumulated in the sealed arm of the tube, and therefore there can be no certainty about the accuracy of the gage, and it is also impossible to release the superfluous gases during the operation of the gage after they have accumulated in order to maintain the vacuum above the liquid in the tube constant.

It is the purpose of my invention to provide a gage in which these difficulties are obviated.

Figure 1:
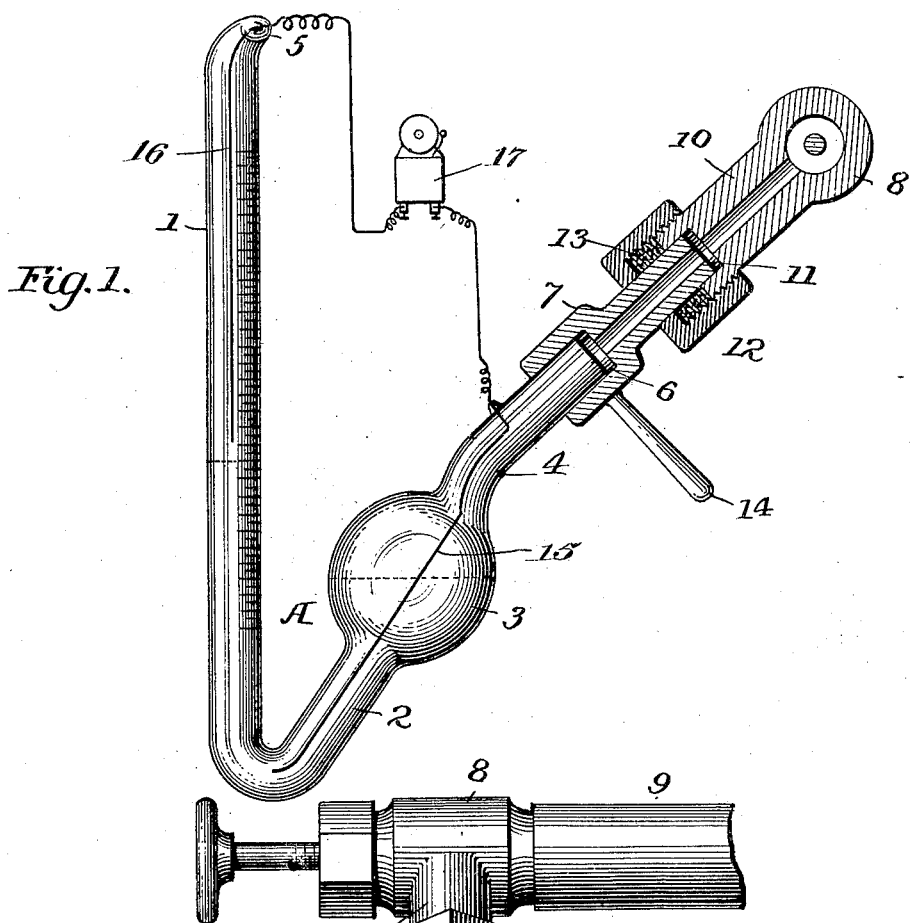
Figure 2:
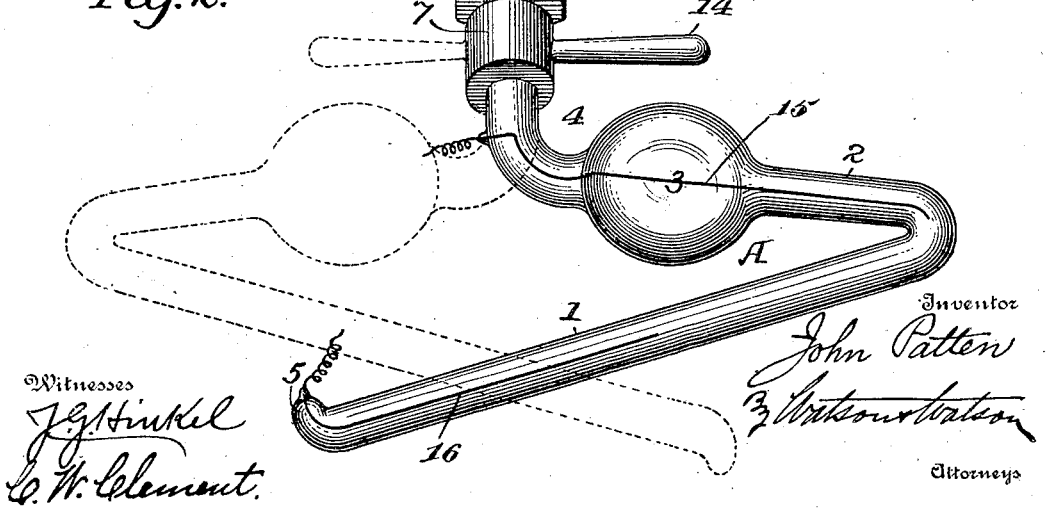

In the accompanying drawings, which illustrate my invention, Figure 1 is a side view of my improved gage in its normal position, the support and coupling-piece being shown in central section; and Fig. 2 is a view taken from in front of the supporting-socket and showing the gage turned about its axis through an angle of about ninety degrees from the position shown in Fig. 1.

Referring to the drawings, A indicates a gage consisting of a glass tube having a general V shape and containing a suitable liquid which is non-volatile in a vacuum at ordinary temperatures. The longer arm 1 of the tube is provided with suitable graduation-marks and is sealed at its outer end, while the shorter arm 2 has an enlarged or bulbous portion 3 midway of its length, and the upper end 4 of said arm is inclined outwardly at an angle to the lower portion, as shown. The tip 5 of the arm 1 is bent over to one side and slightly inward toward the opposite arm of the tube in order to form a small pocket or cavity within the tube, which will be out of line with its bore, for a purpose hereinafter explained. The open end 4 of the tube is sealed within a socket 6, formed in a tubular coupling-piece 7, by which it may be detachably connected to a T 8 upon a pipe 9, leading to the chamber from which the air is to be exhausted. The arm 10 of the T, which forms the support for the gage, is inclined downwardly at an angle of about forty-five degrees, as shown, and is formed with a socket 11, adapted to receive the end of the coupling-piece. The coupling-piece is normally held in place within the socket in an air-tight manner by means of a nut 12 and a packing-ring 13. By means of a handle 14 upon the coupling-piece the latter may be turned within the socket 11, so as to rotate the gage without bringing any strain upon the glass.

Fig. 1 represents the normal position of the gage while in use, the height of the liquid within the sealed arm of the tube indicating the vacuum when the liquid is in proper condition and only the proper amount of air or gas is retained within the tube above the liquid in the sealed end. Owing to the inclination of the coupling-piece, the axis about which the gage turns is inclined, and when the gage is rotated to the right or to the left to an angle of about ninety degrees, as shown in Fig. 2, the graduated arm of the gage is brought below the other arm and the bore of the tube is inclined upwardly through both arms from the sealed end. The sealed tip 5 is so formed that when the gage is rotated to the left from its normal position into the position shown in full lines in Fig. 2 said tip will project upwardly and the pocket or cavity within the tube will extend above the bore of the tube. When rotated into this position, therefore, all of the gas within the graduated arm will escape except a small quantity, which will be retained within the aforesaid cavity. On the other hand, when the gage is rotated to the right into the position shown in dotted lines, Fig. 2, the pocket or cavity in the sealed end will not project above the bore in the tube, but will extend downwardly, so that in this latter position all of the air or gas will pass out of the tube, none being retained within the pocket. As liquids that will stand a high vacuum are liable to absorb certain gases when exposed to the atmosphere or to contain a small percentage of some foreign volatile liquid, it is necessary in order to bring the liquid to proper condition for measuring a vacuum to boil it under the highest vacuum that is to be maintained in the chamber and to permit the gases evolved by the heat to escape. To accomplish this, the gage is rotated into the position shown in dotted lines and then heated, when the gases will pass upward through it and out, after which the gage is returned to its normal position. With any good liquid suitable for measuring very high vacuums I have found that when the gage is returned to its normal position after the gases have been expelled the liquid will not fall in the sealed arm of the tube unless the tube be struck violently or be again heated sufficiently to generate a little vapor in said sealed arm. Both of these methods are objectionable, as the gage is liable to be broken when struck hard enough to dislodge the liquid and the heat is liable to generate a quantity of gas more objectionable than that which had just been released, thereby destroying the accuracy of the gage. Sometimes where the liquid is a very perfect one it cannot be made to fall by either method. It is desirable, therefore, with a liquid of this character to retain a certain uniform quantity of gas in the tube instead of releasing it all. I accomplish this by providing the small cavity or pocket in the sealed arm of the tube out of line with its bore, which cavity when the tube is rotated into the position shown in full lines, Fig. 2, will retain a small measured quantity of gas after the remainder of the gas has passed off. With this measured quantity of gas retained in the tube the liquid will fall when the tube is turned back to its normal position and will accurately indicate the vacuum. For less perfect liquids, from which gases are evolved during usage from any cause, it is not necessary or desirable to retain any gas within the pocket, and I therefore prefer with such liquids to rotate the sealed arm to the right, as shown in dotted lines, Fig. 2, as often as need be to liberate all of the accumulated gas.

It will be seen that with the arrangement shown I am enabled by rotating the gage to observe the condition of the vacuum in the sealed end of the tube and to release all of the accumulated gas or retain a small measured quantity, as the conditions may require, and thus maintain the accuracy of the gage. The bulbous portion of the tube has a diameter many times greater than the diameter of the bore of the tube, and any slight variation of pressure upon the surface of the liquid in the bulb will cause a much greater movement of the column in the sealed arm than if the tube were of uniform diameter throughout. The pocket or cavity in the sealed arm of the tube may be located elsewhere than at the tip, and it may be made in any suitable way, so as to retain a small quantity of gas when the tube is rotated in one direction to liberate the superfluous gas. The tube may be of any suitable form, having the two upright arms united by a bent portion, generally spoken of as "U-shaped." Mercury is a suitable liquid for use in the tube where great accuracy is not required. Where greater accuracy is required for measuring high vacuums, certain oils are more desirable on account of their high boiling-points and light specific gravities, although they are objectionable on account of the readiness with which they absorb gases from the atmosphere when not in use, and some of them develop gases in the sealed end of the tube, requiring frequent rotation of the gage to relieve the accumulated gases and frequent boiling. I have found sulfuric acid having a specific gravity of about 66° Baumé a very suitable liquid to use, as it does not absorb gases from the atmosphere to any extent while not in use and does not develop gases in the tube if kept free from foreign substances.

It is often desirable to have some device for sounding an alarm to indicate when the vacuum in the chamber to which the open end of the gage is connected is impaired to a predetermined degree. This may be accomplished, as shown in the drawings, by inserting a platinum wire 15 in the shorter arm 2 of the gage and arranging it so that it will be permanently immersed in the liquid and a second wire 16 in the longer arm of the gage so arranged that it will contact with the liquid when the vacuum at the open end of the tube is impaired to the degree at which it is desirable to sound an alarm. At this point the mercury or other fluid rising in the closed arm of the gage will complete an electric circuit through the terminals 15 16 and through a bell 17 or other sounding device. In Fig. 1 the bell is shown in diagram. It will be understood, of course, that it may be placed at any convenient point.

Having described my invention, what I claim, and desire to secure by Letters Patent of the United States, is—

1. A vacuum-gage comprising a U-shaped tube open at one end, the other end being sealed and having a pocket or cavity out of line with the bore of the tube, in combination with a support in which said gage is revolubly mounted, for the purpose set forth.

2. In a vacuum-gage a U-shaped tube open at one end and having its other end sealed and bent over to provide a pocket or cavity out of line with the bore of the tube, in combination with a support in which said tube is revolubly mounted, for the purpose set forth.

3. A vacuum-gage comprising a U-shaped tube, one arm of which is sealed and formed with a pocket or cavity out of line with the bore of the tube, the other arm of said tube having an enlarged bulbous portion or chamber, in combination with a support in which said gage is revolubly mounted, for the purpose set forth.

4. A vacuum-gage comprising a U-shaped tube one arm of which is sealed and formed with a pocket or cavity out of line with the bore of the tube, the other arm of said tube having an enlarged bulbous portion or chamber and an open end extending upwardly from the chamber at an angle to the lower part of the arm, and a downwardly-inclined tubular support to which said attaching end is revolubly connected.

5. A vacuum-gage comprising a U-shaped glass tube one arm of which is sealed and formed with a pocket or cavity out of line with the bore of the tube, the other arm of said tube having an enlarged bulbous portion or chamber and an open end extending upwardly from the chamber at an angle to the lower part of the arm, a coupling-piece upon said end, and a tubular support having a downwardly-inclined socket adapted to receive said coupling-piece.

6. A vacuum-gage comprising a U-shaped glass tube, one arm of which is open, the other being sealed and formed with a pocket or cavity out of line with the bore of the tube, and a tubular coupling-piece secured to said open arm, in combination with a support to which said coupling-piece is revolubly connected, for the purpose set forth.

In testimony whereof I affix my signature in presence of two witnesses.

JOHN PATTEN.

Witnesses:
 FELIX R. SULLIVAN,
 LOUIS A. KATZENBERGER.